United States Patent
Daniels et al.

(10) Patent No.: US 8,004,106 B2
(45) Date of Patent: Aug. 23, 2011

(54) YAW BEARING CLEANING ASSEMBLY FOR WIND TURBINE

(75) Inventors: Jeffrey Michael Daniels, Schenectady, NY (US); Chad Kegan Robey, Milton, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/872,511

(22) Filed: Aug. 31, 2010

(65) Prior Publication Data

US 2011/0140442 A1    Jun. 16, 2011

(51) Int. Cl.
*F03D 7/04* (2006.01)
(52) U.S. Cl. .............................................. 290/55; 416/1
(58) Field of Classification Search .................... 290/43, 290/44, 54, 55; 416/1, 31
See application file for complete search history.

(56) References Cited

U.S. PATENT DOCUMENTS

| | | | |
|---|---|---|---|
| 1,839,549 A * | 1/1932 | Haller et al. ....................... | 184/4 |
| 6,520,737 B1 | 2/2003 | Fischer et al. | |
| 6,991,378 B2 | 1/2006 | Jacquemont et al. | |
| 7,108,485 B2 | 9/2006 | Wobben | |
| 7,134,631 B2 | 11/2006 | Loth | |
| 7,458,776 B2 | 12/2008 | LLorente Gonzalez et al. | |
| 7,658,594 B2 | 2/2010 | Christensen et al. | |
| 7,730,627 B2 | 6/2010 | Mashue et al. | |
| 7,789,623 B2 * | 9/2010 | Teipen .......................... | 415/232 |
| 7,946,814 B2 * | 5/2011 | Honhoff ............................ | 416/1 |
| 2007/0056801 A1 | 3/2007 | Iversen | |
| 2010/0054940 A1 | 3/2010 | Honhoff | |

* cited by examiner

*Primary Examiner* — Nicholas Ponomarenko
(74) *Attorney, Agent, or Firm* — James McGinniss, Esq.; Armstrong Teasdale LLP (57) ABSTRACT

A yaw bearing cleaning assembly for use with a wind turbine. The wind turbine includes a yaw bearing that is coupled between a nacelle and a tower for rotating the nacelle about a yaw axis. The yaw bearing cleaning assembly includes a support bracket that is coupled to the nacelle. At least one cleaning member is coupled to the support bracket. The at least one cleaning member extends from the support bracket and positioned adjacent an outer radial surface of the yaw bearing to facilitate removing debris from at least a portion of the yaw bearing when the nacelle is rotated about the yaw axis.

20 Claims, 6 Drawing Sheets

YAW BEARING CLEANING ASSEMBLY FOR WIND TURBINE

BACKGROUND OF THE INVENTION

The embodiments described herein relate generally to a yaw system including a yaw bearing cleaning assembly for use in wind turbines.

At least some known wind turbines include a nacelle fixed atop a tower. The nacelle includes a rotor assembly coupled to a generator through a shaft. In known rotor assemblies, a plurality of rotor blades extend from a rotor. The rotor blades are oriented such that wind passing over the rotor blades turns the rotor and rotates the shaft, thereby driving the generator to generate electricity. At least some known nacelles include a yaw system for controlling a perspective of the rotor relative to a direction of wind.

Known yaw systems are configured to rotate the nacelle about a yaw axis to adjust the perspective of the rotor. Additionally, known yaw systems are configured to maintain a perspective of the rotor with respect to the wind direction. Known yaw systems include a yaw bearing and a yaw drive system that engages the yaw bearing to rotate the nacelle. At least some known wind turbines are operated in locations that may include a significant volume of dust and debris that are carried in the wind. As the wind passes over the wind turbine, dust and debris can accumulate on wind turbine components, such as, for example, one or more yaw bearings. Overtime, the accumulation of dust and debris reduces the ability of the yaw drive system to engage the yaw bearing to rotate the nacelle. In addition, the accumulation of debris on the yaw bearing may increase the mechanical wear of the yaw drive system and the yaw bearing. In known wind turbines, of the wind turbine must be shut down to manually clean the yaw bearing to remove the accumulated debris.

BRIEF DESCRIPTION OF THE INVENTION

In one aspect, a yaw bearing cleaning assembly for use with a wind turbine is provided. The wind turbine includes a yaw bearing that is coupled between a nacelle and a tower for rotating the nacelle about a yaw axis. The yaw bearing cleaning assembly includes a support bracket that is coupled to the nacelle. At least one cleaning member is coupled to the support bracket. The at least one cleaning member extends from the support bracket and positioned adjacent an outer radial surface of the yaw bearing to facilitate removing debris from at least a portion of the yaw bearing when the nacelle is rotated about the yaw axis.

In another aspect, a yaw system for use with a wind turbine is provided. The wind turbine including a nacelle that is coupled to a tower. The yaw system includes a yaw bearing that is coupled between the nacelle and the tower for rotating the nacelle about a yaw axis. The yaw bearing includes an outer surface. A yaw bearing cleaning assembly is coupled to the nacelle. The yaw bearing cleaning assembly is positioned adjacent the outer surface for removing debris from at least a portion of the outer surface when the nacelle is rotated about the yaw axis.

In yet another aspect, a wind turbine is provided. The wind turbine system includes a tower, a nacelle that is rotatably coupled to the tower, and a yaw bearing that is coupled between the nacelle and the tower for rotating the nacelle about a yaw axis. The yaw bearing includes an outer surface. A yaw bearing cleaning assembly is coupled to the nacelle. The yaw bearing cleaning assembly is positioned adjacent the yaw bearing to facilitate removing debris from at least a portion of the yaw bearing when the nacelle is rotated about the yaw axis.

DETAILED DESCRIPTION OF THE INVENTION

The embodiments described herein facilitate removing debris from a yaw bearing. More specifically, the yaw assembly described herein includes a yaw bearing cleaning assembly that facilitates removing debris from at least a portion of the yaw bearing to prevent debris from accumulating on a sensor assembly positioned with respect to the yaw bearing. By including a yaw bearing cleaning assembly, the duration of time required to manually clean a yaw bearing is reduced. As used herein, the term "debris" refers to one or more of dirt, dust, insects, insect remains, particles, particulates, substances, suspended liquids, solids, and/or any other material that may contact and accumulate in and/or on the yaw bearing or the components of the wind turbine.

Figure 1:
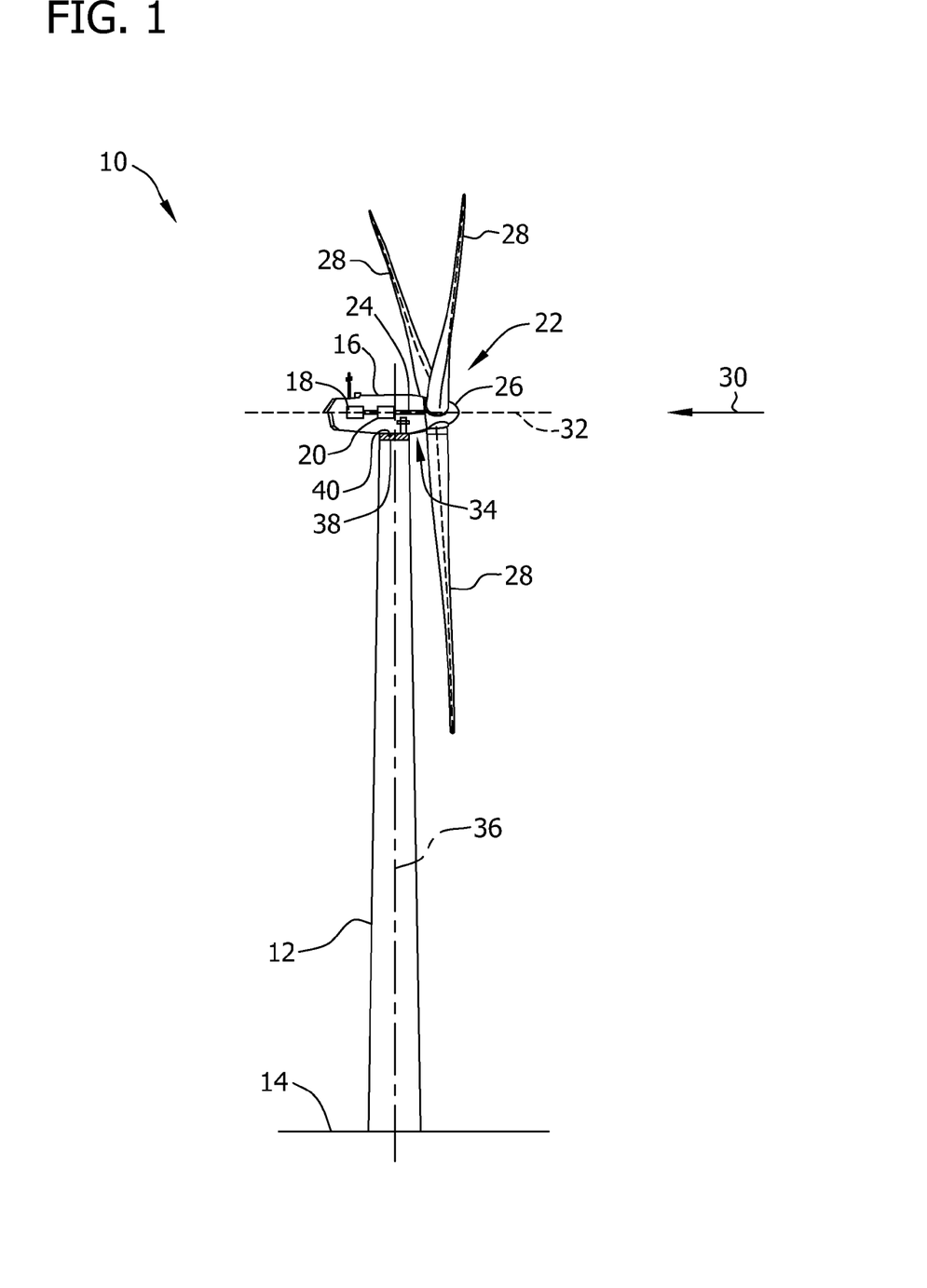
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a supporting surface 14, a nacelle 16 that is mounted on tower 12, a generator 18 that is positioned within nacelle 16, and a gearbox 20 that is coupled to generator 18. A rotor 22 is rotatably coupled to gearbox 20 with a rotor shaft 24. Rotor 22 includes a rotatable hub 26 and at least one rotor blade 28 coupled to and extending outwardly from hub 26.

In the exemplary embodiment, rotor 22 includes three rotor blades 28. In an alternative embodiment, rotor 22 includes more or less than three rotor blades 28. In the exemplary embodiment, tower 12 is fabricated from tubular steel to define a cavity (not shown in FIG. 1) that extends between supporting surface 14 and nacelle 16. In an alternative embodiment, tower 12 is any suitable type of tower having any suitable height.

Rotor blades 28 are spaced about hub 26 to facilitate rotating rotor 22 to enable kinetic energy to be transferred from the wind into usable mechanical energy, and subsequently, electrical energy. In the exemplary embodiment, each rotor blade 28 has a length ranging from about 30 meters (m) (99 feet (ft)) to about 120 m (394 ft). Alternatively, rotor blades 28 may have any suitable length that enables wind turbine 10 to function as described herein. For example, other non-limiting examples of rotor blade lengths include 10 m or less, 20 m, 37 m, or a length that is greater than 120 m. As wind strikes rotor blades 28 from a direction 30, rotor 22 is rotated about an axis of rotation 32.

In the exemplary embodiment, a yaw system 34 is coupled to nacelle 16 and to tower 12 to adjust a yaw of nacelle 16. As used herein, the term "yaw" refers to an orientation of nacelle 16 with respect to wind direction 30. In the exemplary embodiment, yaw system 34 is configured to selectively rotate nacelle 16 and rotor 22 with respect to tower 12 about a yaw axis 36 to control the perspective of rotor blades 28 with respect to wind direction 30. During operation, as wind direction 30 changes, yaw system 34 adjusts a yaw of nacelle 16 to facilitate maintaining the perspective of rotor 22 to wind direction 30.

In the exemplary embodiment, yaw system 34 includes a yaw bearing 38 and a yaw bearing cleaning assembly 40. Yaw bearing 38 is coupled between nacelle 16 and tower 12 to facilitate rotating nacelle 16 with respect to tower 12. Yaw bearing cleaning assembly 40 is coupled to nacelle 16 and positioned adjacent to yaw bearing 38. Yaw bearing cleaning assembly 40 is configured to facilitate removing debris from at least a portion of yaw bearing 38 when nacelle 16 is rotated about yaw axis 36.

Figure 2:
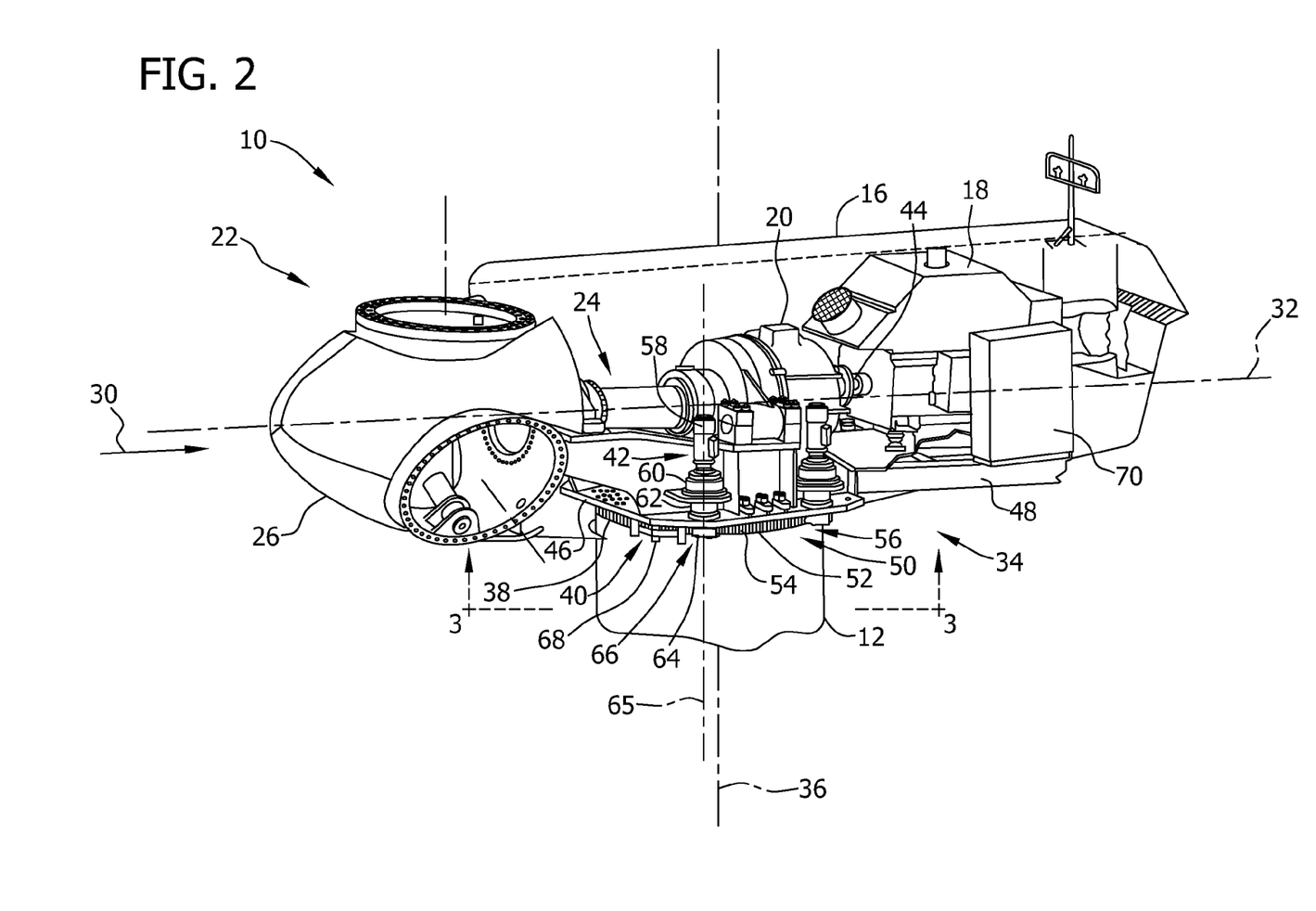
FIG. 2 is an enlarged perspective view of a portion of the wind turbine shown in FIG. 1 including an exemplary yaw system.
Figure 3:
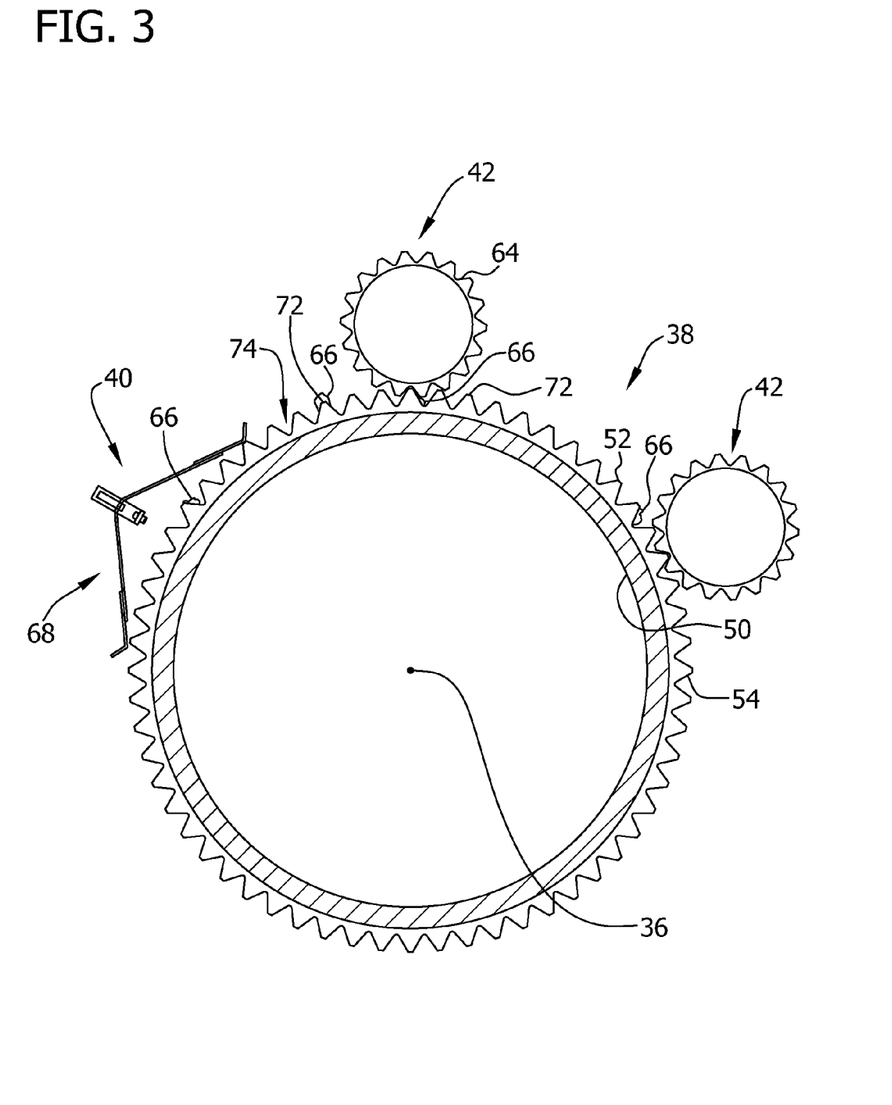
FIG. 3 is a partial cross-sectional view of an exemplary yaw system suitable for use with the wind turbine shown in FIG. 1.

FIG. 2 is an enlarged perspective view of a portion of wind turbine 10. FIG. 3 is a partial cross-sectional view of yaw system 34 along sectional line 3-3 in FIG. 2. Identical components shown in FIG. 3 are labeled with the same reference numbers used in FIG. 2. In the exemplary embodiment, yaw system 34 includes at least one yaw drive assembly 42 that is coupled to a yaw bearing 38. Yaw drive assembly 42 is configured to engage yaw bearing 38 to cause nacelle 16 and rotor 22 to rotate about yaw axis 36. Rotor shaft 24 is positioned within nacelle 16 and is coupled between rotor 22 and gearbox 20. More specifically, rotor shaft 24 is coupled to hub 26 such as hub 26 rotates about axis of rotation 32 rotor shaft 24 rotates about axis of rotation 32. A high speed shaft 44 is coupled between gearbox 20 and generator 18. In the exemplary embodiment, during operation of wind turbine 10, rotor shaft 24 rotates to drive gearbox 20 that subsequently drives high speed shaft 44. High speed shaft 44 rotatably drives generator 18 to facilitate production of electrical power by generator 18. Gearbox 20, rotor shaft 24, and yaw drive assembly 42 are each supported by a bedplate frame 46. Generator 18 is supported by a generator frame 48 that is cantilevered from bedplate frame 46.

In the exemplary embodiment, yaw bearing 38 is coupled to bedplate frame 46 and to tower 12. Yaw bearing 38 is configured to enable nacelle 16 to rotate with respect to tower 12. In the exemplary embodiment, yaw bearing 38 includes an inner race 50 that is coupled to an outer race 52 such that inner race 50 rotates relative to outer race 52 about yaw axis 36. Inner race 50 is coupled to bedplate frame 46. Outer race 52 is securely coupled to tower 12, or integrated with tower 12. Outer race 52 includes a plurality of bearing teeth 54 that are spaced circumferentially about an outer radial surface 56 of outer race 52. Bearing teeth 54 engage yaw drive assembly 42 such that an operation of yaw drive assembly 42 rotates inner race 50 with respect to outer race 52 and rotates nacelle 16 about yaw axis 36. Alternatively, outer race 52 may be coupled to bedplate frame 46 and yaw drive assembly 42 may be configured to engage inner race 50 to rotate outer race 52 with respect to inner race 50.

In the exemplary embodiment, yaw drive assembly 42 includes a yaw drive motor 58, a yaw gearbox 60 that is coupled to yaw drive motor 58, a yaw drive shaft 62 that is rotatably coupled to yaw gearbox 60, and a yaw pinion 64 that is coupled to yaw drive shaft 62. Yaw drive motor 58 is configured to impart a mechanical force to yaw gearbox 60. Yaw gearbox 60 is configured to convert the mechanical force into a rotational force, and to impart the rotational force to yaw drive shaft 62. Yaw drive shaft 62 is coupled between yaw gearbox 60 and yaw pinion 64. During operation of yaw drive assembly 42, yaw drive motor 58 imparts a mechanical force to yaw gearbox 60, which in turn translates the force into rotational energy. Yaw gearbox 60 then rotates yaw drive shaft 62 about a yaw drive axis 65. Yaw drive shaft 62 rotates yaw pinion 64 about yaw drive axis 65, such that yaw pinion 64 engages yaw bearing 38 and causes nacelle 16 to rotate about yaw axis 36. More specifically, yaw pinion 64 is configured to engage bearing teeth 54 such that as yaw pinion 64 rotates, nacelle 16 rotates about yaw axis 36. In the exemplary embodiment, a lubricating material 66 is positioned between yaw pinion 64 and bearing teeth 54 that facilitates reducing friction between yaw pinion 64 and bearing teeth 54. Material 66 may be a grease, a lubricating oil, a friction reducing substance, and/or any suitable material that enables yaw system to function as described herein.

In the exemplary embodiment, yaw system 34 includes at least one sensor assembly 68 that is communicatively coupled to a control system 70. Control system 70 is operatively coupled to yaw drive assembly 42. In the exemplary embodiment, sensor assembly 68 is coupled to bedplate frame 46 and is positioned with respect to yaw bearing 38. Sensor assembly 68 is configured to generate a signal indicative of a condition of yaw bearing 38 and to transmit the generated signal to control system 70.

In the exemplary embodiment, yaw bearing cleaning assembly 40 is coupled to bedplate frame 46 and is positioned adjacent bearing teeth 54 to disperse material to limit undesirable accumulation of material 66 from at least a portion of yaw bearing teeth 54. Yaw bearing cleaning assembly 40 is further positioned with respect to sensor assembly 68 to limit an accumulation of debris on sensor assembly 68 from yaw bearing 38.

During operation of yaw system 34, as yaw pinion 64 engages bearing teeth 54, yaw pinion 64 moves material 66 from between adjacent bearing teeth 54 to a top surface 72 of bearing teeth 54. Material 66 also accumulates debris which may adversely affect the operation of sensor assembly 68. Yaw bearing cleaning assembly 40 moves material 66 from at least a portion of bearing teeth 54 into a gap 74 defined between adjacent bearing teeth 54 to prevent or limit accumulation of material 66 and/or debris on or around sensor assembly 68 that may adversely affect sensor assembly 68 operation.

Figure 4:
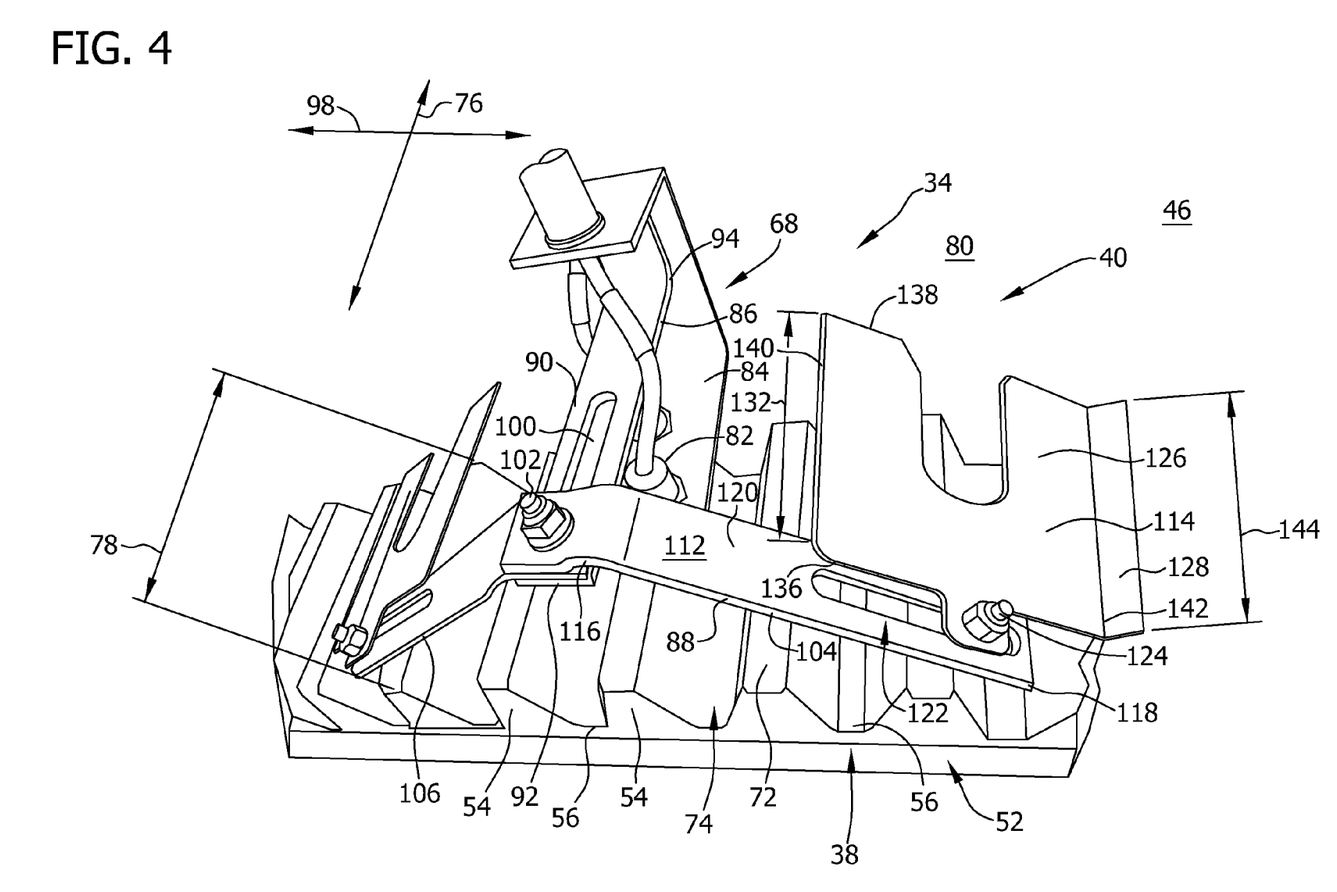
FIG. 4 is an enlarged perspective view of a portion of the yaw system shown in FIG. 2 including an exemplary yaw bearing cleaning assembly.
Figure 5:
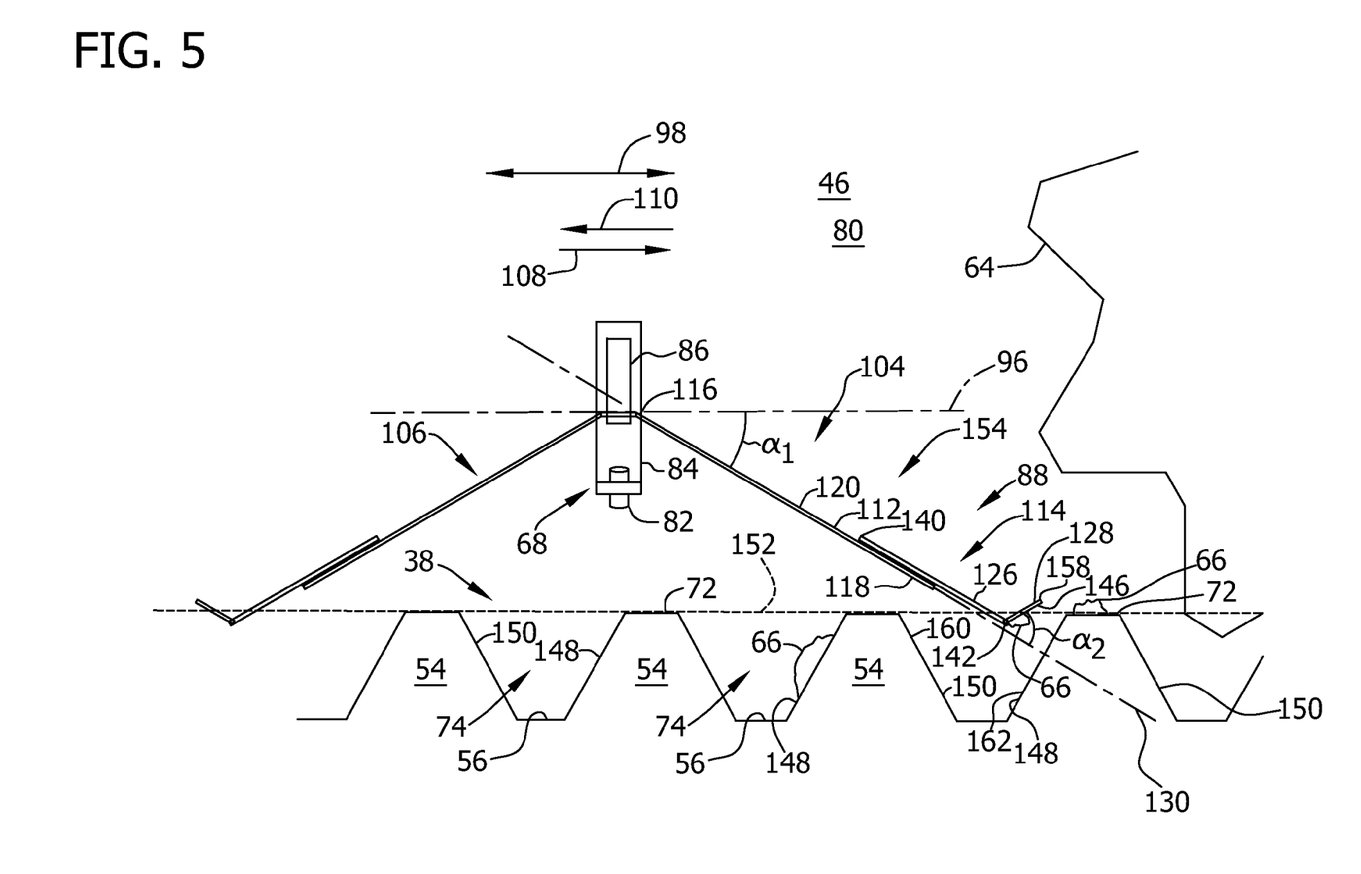
FIG. 5 and FIG. 6 are partial schematic views of the yaw system shown in FIG. 2.
Figure 6:
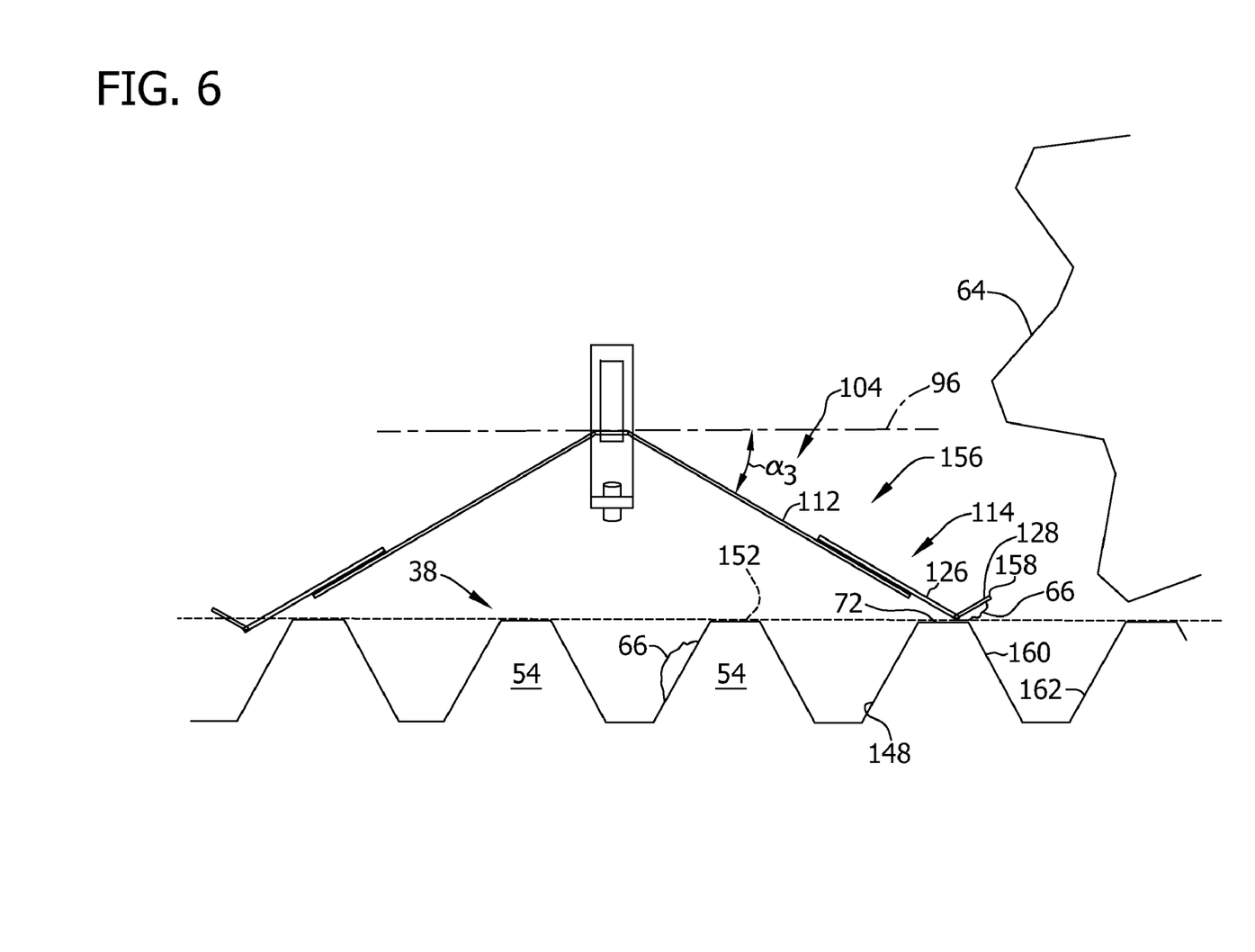

FIG. 4 is an enlarged perspective view of a portion of yaw system 34. FIG. 5 and FIG. 6 are partial schematic views of yaw system 34. Identical components shown in FIGS. 4-6 are identified with the same reference numbers used in FIG. 2. In the exemplary embodiment, yaw bearing 38 extends outwardly from bedplate frame 46 in a longitudinal direction 76. Yaw bearing 38 has a width 78 defined in longitudinal direction 76. Sensor assembly 68 is coupled to an outer surface 80 of bedplate frame 46 and is positioned with respect to yaw bearing 38 for sensing a condition of yaw bearing 38. Sensor assembly 68 includes at least one sensor 82 coupled to a sensor support bar 84. Sensor support bar 84 is coupled to bedplate frame 46 and extends outwardly from outer surface 80. Sensor 82 is coupled to sensor support bar 84 and is positioned adjacent outer radial surface 56 of yaw bearing 38 to facilitate sensing a condition of yaw bearing 38. Yaw bearing cleaning assembly 40 includes a support bracket 86 and at least one cleaning member 88 that is coupled to support bracket 86. Support bracket 86 is coupled to bedplate frame 46 for supporting yaw bearing cleaning assembly 40 from bedplate frame 46. In one embodiment, support bracket 86 is coupled to sensor support bar 84 such that sensor support bar 84 is coupled between support bracket 86 and bedplate frame 46. Alternatively, support bracket 86 may be coupled between sensor support bar 84 and bedplate frame 46.

In the exemplary embodiment, support bracket 86 extends outwardly from bedplate frame 46 in longitudinal direction 76 and is oriented substantially parallel to outer radial surface 56 of yaw bearing 38. Support bracket 86 includes a sidewall 90 that has a first end 92 and a second end 94. Sidewall 90 extends outwardly from outer surface 80 of bedplate frame 46 and defines a first plane 96 (shown in FIG. 5) that is oriented substantially tangentially with respect to outer radial surface 56 of yaw bearing 38. Second end 94 is coupled to bedplate frame 46. Cleaning member 88 is coupled to sidewall 90 at first end 92 and extends outwardly from support bracket 86 in a transverse direction 98 that is perpendicular to longitudinal direction 76. Cleaning member 88 is oriented obliquely with respect to first plane 96 from support bracket 86 towards yaw bearing 38. Cleaning member 88 is positioned adjacent yaw bearing 38 to contact yaw bearing 38 to facilitate removing material 66 and/or debris from at least a portion of outer radial surface 56 of yaw bearing 38. A slot 100 is defined within sidewall 90 and a fastener 102 is inserted through cleaning member 88 and through slot 100 to facilitate coupling cleaning member 88 to support bracket 86. Slot 100 is sized to facilitate adjusting an orientation of cleaning member 88 with respect to support bracket 86 to properly position cleaning member 88 with respect to outer radial surface 56 of yaw bearing 38.

In the exemplary embodiment, yaw bearing cleaning assembly 40 includes a first cleaning member 104 and a second cleaning member 106. First cleaning member 104 extends outwardly from support bracket 86 in a first direction 108. Second cleaning member 106 extends outwardly from support bracket 86 in a second direction 110 that is different from first direction 108. In a particular embodiment, sensor assembly 68 is positioned between first cleaning member 104 and second cleaning member 106 to enable first cleaning member 104 and second cleaning member 106 to facilitate preventing material 66 and/or debris from contacting sensor 82 from yaw bearing 38.

In the exemplary embodiment, cleaning member 88 includes a support bar 112 and a cleaning plate 114 that is coupled to support bar 112. Support bar 112 is coupled to support bracket 86 and extends outwardly from support bracket 86 in transverse direction 98. Support bar 112 is oriented obliquely with respect to first plane 96 from support bracket 86 towards yaw bearing 38 such that an angle $\alpha_1$ is defined between first plane 96 and support bar 112. Support bar 112 includes a first end 116 and a second end 118. First end 116 is coupled to support bracket 86 to support cleaning member 88 from support bracket 86. Cleaning plate 114 is coupled to second end 118 such that cleaning plate 114 is positioned adjacent yaw bearing 38. Support bar 112 includes an outer surface 120 and defines a slot 122. Cleaning plate 114 is coupled to support bar 112 with a fastener 124 that is inserted through slot 122. Slot 122 is sized to facilitate adjusting an orientation of cleaning plate 114 with respect to support bar 112. Support bar 112 is configured to bias cleaning plate 114 towards outer radial surface 56 of yaw bearing 38 such that cleaning plate 114 contacts yaw bearing 38.

In the exemplary embodiment, sensor 82 is positioned nearer to bedplate frame 46 than support bar 112. Cleaning plate 114 is oriented substantially parallel to support bar 112 and extends outwardly from support bar 112 towards bedplate frame 46. Alternatively, support bar 112 may be positioned at any location along support bracket 86 and/or sensor support bar 84 to position cleaning plate 114 with respect to sensor 82 to facilitate preventing material 66 and/or debris from contacting sensor 82 from yaw bearing 38.

In the exemplary embodiment, cleaning plate 114 includes a base plate 126 and a cleaning flange 128. Base plate 126 is coupled to support bar 112 and is oriented substantially parallel with support bar 112 to define a second plane 130 that is oriented obliquely with respect to first plane 96. Base plate 126 extends outwardly from support bar 112 towards bedplate frame 46. Base plate 126 has a width 132 defined along longitudinal direction 76 and is positioned with respect to yaw bearing such that width 132 of base plate 126 overlaps at least a portion of width 78 of yaw bearing 38. Base plate 126 has a substantially rectangular shape that extends between a first end 136 and an opposite second end 138 in longitudinal direction 76, and between a first outer edge 140 and a second outer edge 142 in transverse direction 98. First end 136 is coupled to support bar 112. Second end 138 is positioned adjacent bedplate frame 46. Second outer edge 142 is positioned nearer to yaw bearing 38 than first outer edge 140. Cleaning flange 128 is coupled to base plate 126 and extends along second outer edge 142. Cleaning flange 128 has a width 144 measured along longitudinal direction 76 such that cleaning flange 128 overlaps at least a portion of width 78 of yaw bearing 38. Cleaning flange 128 extends outwardly from base plate 126 and includes a contact surface 146 that is oriented obliquely with respect to base plate 126 to define a second angle $\alpha_2$ between cleaning flange 128 and second plane 130.

In the exemplary embodiment, bearing teeth 54 are spaced circumferentially about outer radial surface 56 such that gap 74 is defined between adjacent bearing teeth 54. Each bearing tooth 54 includes first flank surface 148, second flank surface 150, and top surface 72 that extends between first flank surface 148 and second flank surface 150. First flank surface 148 and second flank surface 150 each extend between yaw bearing outer radial surface 56 and top surface 72. A tangential plane 152 is defined between each top surface 72 of adjacent bearing teeth 54. In the exemplary embodiment, each bearing tooth 54 includes a substantially trapezoidal shape with first flank surface 148 and second flank surface 150 obliquely oriented with respect to top surface 72 and oriented to converge from outer radial surface 56 towards top surface 72. In an alternative embodiment, bearing tooth 54 may have a substantially rectangular shape with first flank surface 148 and second flank surface 150 oriented substantially perpendicular to top surface 72.

In the exemplary embodiment, cleaning member 88 is movable between a first position 154 (shown in FIG. 5) and a second position 156 (shown in FIG. 6). In first position 154, cleaning plate 114 is positioned between adjacent bearing teeth 54 such that base plate 126 is at least partially positioned within gap 74. Second outer edge 142 of base plate 126 is positioned between outer radial surface 56 of yaw bearing 38 and tangential plane 152. At least a portion of cleaning flange 128 penetrates tangential plane 152 such that an outer edge 158 of cleaning flange 128 is positioned outwardly from tangential plane 152. Cleaning flange 128 is positioned with respect to yaw bearing 38 such that contact surface 146 of cleaning flange 128 contacts at least a portion of first flank surface 148 as yaw bearing 38 rotates to facilitate placing material 66 onto first flank surface 148. In second position 156, support bar 112 is oriented with respect first plane 96 to define an angle $\alpha_3$ between first plane 96 and support bar 112 that is less than angle $\alpha_1$, such that cleaning flange 128 contacts top surface 72 to facilitate removing material 66 from at least a portion of top surface 72. During operation, as yaw bearing 38 rotates about yaw drive axis 65, a first bearing tooth 160 contacts cleaning flange 128 to move cleaning member 88 from first position 154 to second position 156. As cleaning member 88 moves from first position 154 to second position 156, cleaning flange 128 contacts first flank surface 148 of first bearing tooth 160 to cause material 66 and/or debris to be placed onto first flank surface 148 from cleaning flange 128. As yaw bearing 38 continues to rotate, cleaning member 88 is urged outwardly by first bearing tooth 160 to contact top surface 72 of first bearing tooth 160. Cleaning flange 128 contacts top surface 72 to remove material 66 and/or debris from at least a portion of top surface 72. As first bearing tooth 160 rotates past cleaning member 88, support bar 112 biases cleaning member 88 from second position 156 to first position 154 such that cleaning flange 128 may contact a second bearing tooth 162 to place material 66 and/or debris onto a first flank surface 148 of second bearing tooth 162, and to remove material 66 and/or debris from top surface 72 of second bearing tooth 162.

The above-described system and apparatus facilitate removing debris from a yaw bearing. More specifically, the yaw system described herein includes a yaw bearing cleaning assembly that facilitates removing debris from the yaw bearing to facilitate reducing the duration of time a wind turbine is required to be shut-down to facilitate manually cleaning a yaw bearing. Moreover, the yaw bearing cleaning assembly described herein facilitates preventing an accumulation of debris on a sensor assembly from the yaw bearing which reduces the occurrence of an erroneous signal generated by the sensor. The ability to remove debris from the yaw bearing during operation of the wind turbine facilitates reducing the duration of time a wind turbine is required to be shut-down to facilitate manually cleaning a yaw bearing. As such, the cost required to operate the wind turbine is significantly reduced.

Exemplary embodiments of systems and apparatus for a yaw system including a yaw bearing cleaning assembly for use in a wind turbine are described above in detail. The systems and apparatus are not limited to the specific embodiments described herein, but rather, components of systems and/or apparatus may be utilized independently and separately from other components and/or steps described herein. For example, the systems may also be used in combination with other rotating systems, and are not limited to practice with only the yaw system as described herein. Rather, the exemplary embodiment can be implemented and utilized in connection with many other rotating system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A yaw bearing cleaning assembly for use with a wind turbine, the wind turbine including a yaw bearing coupled between a nacelle and a tower for rotating the nacelle about a yaw axis, said yaw bearing cleaning assembly comprising:
    a support bracket coupled to the nacelle; and,
    at least one cleaning member coupled to said support bracket, said at least one cleaning member extending from said support bracket and positioned adjacent an outer radial surface of the yaw bearing to facilitate removing debris from at least a portion of the yaw bearing when the nacelle is rotated about the yaw axis.

2. A yaw bearing cleaning assembly in accordance with claim 1, wherein said cleaning member comprises:
    a support bar coupled to said support bracket, said support bar extending obliquely outwardly from said support bracket towards the outer radial surface of the yaw bearing; and,
    a cleaning plate coupled to said support bar, said cleaning plate positioned adjacent the outer radial surface.

3. A yaw bearing cleaning assembly in accordance with claim 2, wherein said cleaning plate comprises:
    a base plate coupled to said support bar, said base plate oriented substantially parallel to said support bar; and,
    a cleaning flange coupled to said base plate, said cleaning flange extending outwardly from said base plate at an oblique angle.

4. A yaw bearing cleaning assembly in accordance with claim 3, wherein the yaw bearing includes a plurality of teeth extending outwardly from the outer radial surface, each tooth of the plurality of teeth including at least one flank surface extending between a top surface and the outer radial surface, said cleaning flange having a contact surface that is oriented to contact the flank surface and the upper surface when the nacelle is rotated about the yaw axis.

5. A yaw bearing cleaning assembly in accordance with claim 2, wherein said support bar is configured to bias said cleaning plate towards the yaw bearing when the yaw bearing contacts said cleaning plate.

6. A yaw bearing cleaning assembly in accordance with claim 1, further comprising:
    a first cleaning member coupled to said support bracket, said first cleaning member extending outwardly from said support bracket in a first direction; and,
    a second cleaning member coupled to said support bracket, said second cleaning member extending outwardly from said support bracket in a second direction different from said first direction.

7. A yaw bearing cleaning assembly in accordance with claim 6, wherein the wind turbine includes a sensor assembly positioned adjacent the yaw bearing, said yaw bearing cleaning assembly coupled to the sensor assembly such that the sensor assembly is positioned between said first cleaning member and said second cleaning member to facilitate preventing debris from contacting the sensor assembly from said yaw bearing.

8. A yaw system for use with a wind turbine, the wind turbine including a nacelle coupled to a tower, said yaw system comprising:
    a yaw bearing coupled between the nacelle and the tower for rotating the nacelle about a yaw axis, said yaw bearing comprising an outer surface; and,
    a yaw bearing cleaning assembly coupled to the nacelle, said yaw bearing cleaning assembly positioned adjacent said outer surface for removing debris from at least a portion of said outer surface when the nacelle is rotated about the yaw axis.

9. A yaw system in accordance with claim 8, wherein said yaw bearing cleaning assembly comprises:
    a support bracket coupled to the nacelle, said support bracket extending from the nacelle; and, at least one cleaning member coupled to said support bracket, said cleaning member extending from said support bracket and positioned adjacent said outer surface of said yaw bearing.

10. A yaw system in accordance with claim 9, wherein said cleaning member comprises:
   a support bar coupled to said support bracket, said support bar extending outwardly from said support bracket at an oblique angle toward said outer surface of said yaw bearing; and,
   a cleaning plate coupled to said support bar, said cleaning plate positioned adjacent said outer surface.

11. A yaw system in accordance with claim 10, wherein said cleaning plate comprises:
   a base plate coupled to said support bar, said base plate oriented substantially parallel to said support bar; and,
   a cleaning flange coupled to said base plate, said cleaning flange extending outwardly from said base plate at an oblique angle.

12. A yaw system in accordance with claim 11, wherein said yaw bearing includes a plurality of teeth extending outwardly from said outer surface of said yaw bearing, each tooth of said plurality of teeth comprising at least one flank surface extending between a top surface and said outer surface, said cleaning flange having a contact surface that is oriented to contact said flank surface and said upper surface when the nacelle is rotated about the yaw axis.

13. A yaw system in accordance with claim 9, wherein said yaw bearing cleaning assembly comprises:
   a first cleaning member coupled to said support bracket, said first cleaning member extending outwardly from said support bracket in a first direction; and,
   a second cleaning member coupled to said support bracket, said second cleaning member extending outwardly from said support bracket in a second direction different from said first direction.

14. A yaw system in accordance with claim 13, further comprising a sensor assembly coupled to said nacelle, said sensor assembly positioned adjacent said yaw bearing, said yaw bearing cleaning assembly coupled to said sensor assembly such that said sensor assembly is positioned between said first cleaning member and said second cleaning member to facilitate preventing debris from contacting said sensor assembly from said yaw bearing.

15. A wind turbine, comprising:
   a tower;
   a nacelle rotatably coupled to said tower;
   a yaw bearing coupled between said nacelle and said tower for rotating said nacelle about a yaw axis, said yaw bearing having an outer surface; and,
   a yaw bearing cleaning assembly coupled to said nacelle, said yaw bearing cleaning assembly positioned adjacent said yaw bearing to facilitate removing debris from at least a portion of said yaw bearing when said nacelle is rotated about said yaw axis.

16. A wind turbine in accordance with claim 15, wherein said nacelle comprises a bedplate frame coupled to said yaw bearing, said yaw bearing cleaning assembly comprising:
   a support bracket coupled to said bedplate frame, said support bracket extending outwardly from said bedplate frame and oriented substantially parallel to said outer surface; and,
   at least one cleaning member coupled to said support bracket, said cleaning member extending outwardly from said support bracket towards said yaw bearing, said cleaning member positioned adjacent said outer surface.

17. A wind turbine in accordance with claim 16, wherein said cleaning member comprises:
   a support bar coupled to said support bracket, said support bar extending outwardly from said support bracket at an oblique angle toward said outer surface; and,
   a cleaning plate coupled to said support bar, said cleaning plate positioned adjacent said outer surface.

18. A wind turbine in accordance with claim 17, wherein said cleaning plate comprises:
   a base plate coupled to said support bar, said base plate oriented substantially parallel to said support bar; and,
   a cleaning flange coupled to said base plate, said cleaning flange extending outwardly from said base plate at an oblique angle.

19. A wind turbine in accordance with claim 16, wherein said yaw bearing cleaning assembly comprises:
   a first cleaning member coupled to said support bracket, said first cleaning assembly extending outwardly from said support bracket in a first direction; and,
   a second cleaning member coupled to said support bracket, said second cleaning member extending outwardly from said support bracket in a second direction different from said first direction.

20. A wind turbine in accordance with claim 19, further comprising a sensor assembly coupled to said bedplate frame, said sensor assembly positioned adjacent said yaw bearing, said yaw bearing cleaning assembly coupled to said sensor assembly such that said sensor assembly is positioned between said first cleaning member and said second cleaning member to facilitate preventing transfer of debris from said yaw bearing to said sensor assembly.

* * * * *